United States Patent
Amsterdam et al.

(10) Patent No.: US 8,266,228 B2
(45) Date of Patent: Sep. 11, 2012

(54) TAGGING COMMUNICATION FILES BASED ON HISTORICAL ASSOCIATION OF TAGS

(75) Inventors: Jeffrey D. Amsterdam, Atlanta, GA (US); Swaminathan Balasubramanian, Southfield, MI (US); John Handy-Bosma, Austin, TX (US); Andrew R. Jones, Austin, TX (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/633,176

(22) Filed: Dec. 8, 2009

(65) Prior Publication Data

US 2011/0137999 A1    Jun. 9, 2011

(51) Int. Cl.
*G06F 15/16* (2006.01)
(52) U.S. Cl. ............... 709/206; 709/201; 455/412.2; 379/142.04
(58) Field of Classification Search .......... 709/206, 709/201; 455/412.2; 379/142.04
See application file for complete search history.

(56) References Cited

U.S. PATENT DOCUMENTS

| | | | |
|---|---|---|---|
| 6,421,675 B1 * | 7/2002 | Ryan et al. ............... 1/1 |
| 6,788,929 B2 * | 9/2004 | Hymel ............ 455/412.2 |
| 7,277,911 B2 * | 10/2007 | Cheah ............... 709/201 |
| 7,310,416 B1 * | 12/2007 | Henderson ......... 379/142.04 |
| 7,558,830 B2 * | 7/2009 | Cama ............... 709/206 |
| 2004/0186848 A1 | 9/2004 | Kobashikawa et al. |
| 2004/0199587 A1 | 10/2004 | McKnight |
| 2006/0041597 A1 | 2/2006 | Conrad et al. |
| 2006/0293904 A1 | 12/2006 | Ramanathan et al. |
| 2007/0073688 A1 | 3/2007 | Fry |
| 2007/0106728 A1 * | 5/2007 | Adams et al. ......... 709/206 |
| 2007/0143298 A1 | 6/2007 | Surendran et al. |
| 2007/0174247 A1 | 7/2007 | Xu et al. |
| 2008/0001717 A1 | 1/2008 | Fiatal |
| 2008/0086458 A1 | 4/2008 | Robinson et al. |
| 2008/0086496 A1 | 4/2008 | Kumar et al. |

OTHER PUBLICATIONS

International Business Machines Corporation, Method for Sender Specified E-Mail Tagging and Sender/Client Tag Remediation, Aug. 26, 2009, IPCOM000186552D, IP.com.
Graham, R.; Plurality: A Context-Aware Personalized Tagging System; Date: Apr. 2008; Item: Paper; WWW 2008; Location: Beijing China.

(Continued)

*Primary Examiner* — Tammy Nguyen
(74) *Attorney, Agent, or Firm* — Robert C. Rolnik; Mark C. Vallone

(57) ABSTRACT

To associate an email with a tag, an email client may receive a tag corresponding to an email attribute, wherein the email attribute is an historical email tag. The email client stores the tag to a record keyed by the email attribute, and receives an email tag request, the email tag request having a word attribute, and looks up at least one record based on the word attribute to find the tag. The email client presents the tag of the at least one record to a user. The email client receives a user selection of the tag to form a selected tag, and sends an email having the selected tag as part of the email header, wherein the email comprises the email tag request.

22 Claims, 4 Drawing Sheets

OTHER PUBLICATIONS

Kim, H.J.; Spam-mail Filtering System using weighted Bayesian classifier; Date: Aug. 2004; Item: Journal of KISS: Software and Applications; Issue: vol. 31, No. 8; Korea Information Science Society; Location: KR.

Rendle, S.; Learning Optimal Ranking with Tensor Factorization for Tag Recommendation; Date: Jun. 2009; KDD 2009; Location: Paris, FR.

IBM; Enforcing E-mail Subject Line Tag Conventions in E-mail Clients; Date: Aug. 8, 2008; Item: Article No. IPCOM000173480D; IP.com.

IBM; A System and Method for Ensuring that Important Electronic Messages are Read and Sufficiently Processed—Leveraging Trust Relationships in Social Networks; Date: Jan. 21, 2009; Item: Article No. IPCOM000178265D; IP.com.

* cited by examiner

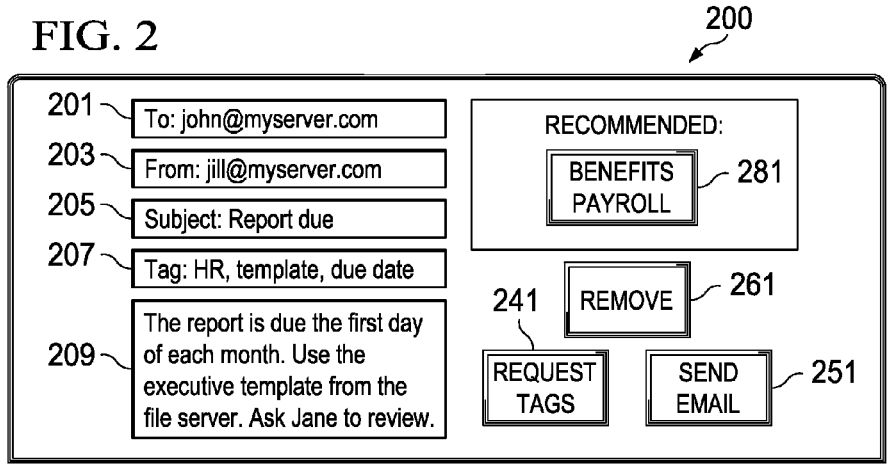
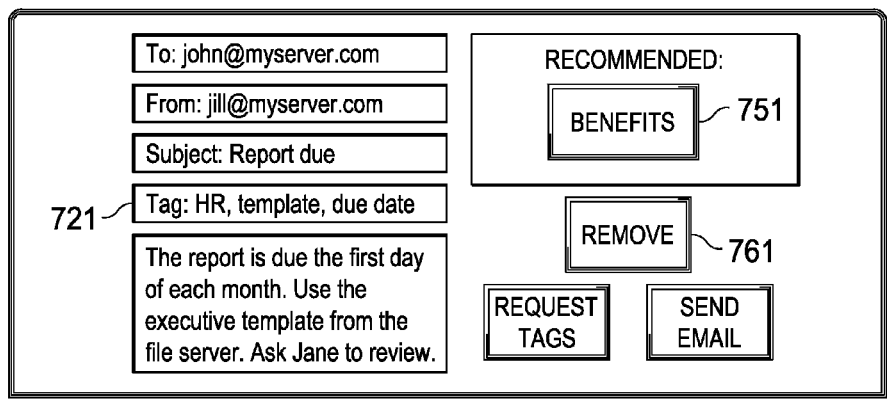
FIG. 3
| | |
|---|---|
| WebSphere | IBM HTTP Server |
| Corporate | Benefits |
| HR | Payroll |
| Cluster | Data center |
| HR | Benefits |
| Notes | Email client |
| Domino | Notes |
| HR | Benefits |
FIG. 5
| | |
|---|---|
| Test | Fox |
| Template | Due date |
| Template | HR |

US 8,266,228 B2

TAGGING COMMUNICATION FILES BASED ON HISTORICAL ASSOCIATION OF TAGS

BACKGROUND OF THE INVENTION

1. Field of the Invention

The present invention relates generally to a computer implemented method, computer program product, and data processing system, for providing context for communication files. More specifically, the present invention relates to providing tags for user selection for a communication file.

2. Description of the Related Art

Modern uses of networked computers provide tools to author and distribute communication files. A communication file is a file created in a manner suitable for access from a server originating with an author or writer, and targeted for reading or consumption by a recipient or subscriber. A communication file may be, for example, an email, a web page or any other file readily suitable for rendering with commonly available clients such as email clients and web browsers. In particular, web pages, often created for mass consumption, are posted or modified on the internet by the millions each day. Similarly, in a large corporation or other organization, thousands of emails are circulated, some intended for general availability within the company. Accordingly, a user can have near limitless access to networks that provide access to communication files, many of which may have little or no relevance to the user's daily activities. In this context, relevance is determined based on the tastes of the user or the tastes of those with authority over the user.

A way to sort among email and web pages, among other communication files, would be helpful for a user to avoid wasting time reading material of little interest to the user.

SUMMARY OF THE INVENTION

The present invention provides a computer implemented method, computer program product, and data processing system, for associating an email with a tag. An email client receives a tag corresponding to an email attribute. The email client stores the tag to a record keyed by the email attribute. The email client receives an email tag request, the email tag request having a word attribute, wherein the word attribute is a word selected from a group consisting of subject line word, body word and email tag. The email client looks up at least one record based on the word attribute to find the tag. The email client presents the tag of the at least one record to a user. The email client receives a user selection of the tag to form a selected tag. The email client sends an email having the selected tag as part of the email header, wherein the email comprises the email tag request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a user interface for receiving user edits to fields to form a draft email in accordance with an illustrative embodiment of the invention;

FIG. 3 is a table of co-occurrences of tags or co-occurrence repository in accordance with an illustrative embodiment of the invention;

FIG. 5 is the set of records that can be appended or otherwise added to the co-occurrence repository in accordance with an illustrative embodiment of the invention;

FIG. 7 is a user interface having a draft email in accordance with an illustrative embodiment of the invention.

DETAILED DESCRIPTION OF THE PREFERRED EMBODIMENT

Figure 1:
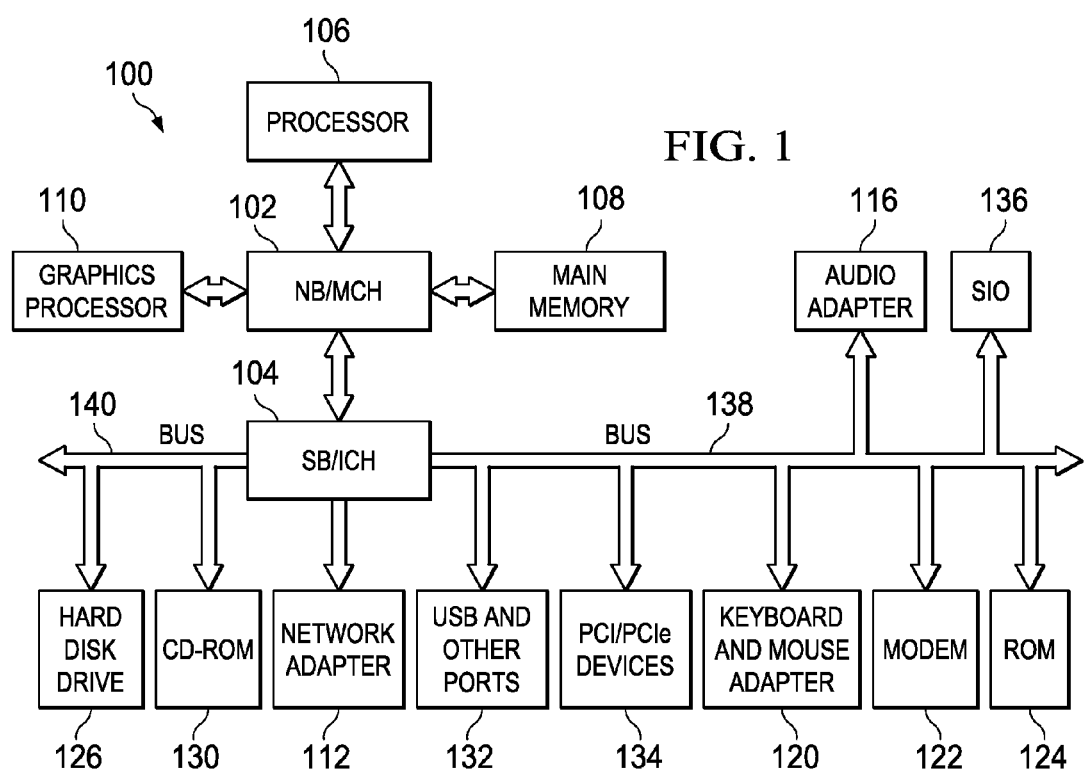
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for soliciting tags from a user when drafting emails or other communication files. The embodiments may rely on the user to supply an initial set of tags, or automatically develop tags based on frequency and other criteria of a word or word attribute present in the draft email. The initial set of tags developed by user choice and/or by an email client may be embellished by relying on a co-occurrence repository that tracks the frequency of word co-occurrence within lists of tags for emails previously sent. The embodiments may place emphasis on recent historical patterns of tag co-occurrence in emails, while de-emphasizing statistics recorded to the co-occurrence repository at distant times in the past.

FIG. 2 is a user interface for receiving user edits to fields to form a draft email in accordance with an illustrative embodiment of the invention. The user interface has open fields for a user to supply attributes for the draft email, for example, as depicted in user interface 200. A user can add attributes to the email. An attribute is a descriptor that provides routing information or content to an email or draft email. A draft email is the content of fields in a user interface that a user may populate. Once populated, a draft email may have a to-attribute and a from-attribute, as well as a subject and a body.

A to-attribute is a string descriptor of at least one recipient for the email, for example, to-attribute 201. A from-attribute is a string descriptor of sender of the email, for example, from-attribute 203. In addition, the user interface may provide for user entry of, for example, subject 205, tag 207, and body 209. Once satisfied with the subject, body and other fields, a user may select a send email button 251 and trigger the attempted dispatch of the draft email as email. Further user inputs can be received through the use of additional buttons of request tag button 241 and remove button 261. Remove button 261 may be coupled to pick-list 281. Such a pick list and button may be arranged to allow a user to select one or more words in the list and remove such words, or tags, in this case, by use of the remove button 261.

However, a user may prefer to receive assistance in selecting tags with which to summarize the content of the email. A tag is a descriptor of content of an email or a draft email. Tags can be used to summarize the content of email or otherwise indicate the context of the email. As such, the tag can be redundant to some content of the email. Nevertheless, the tag can be used by a sender to communicate to recipients of the email those topics that are chiefly in the mind of the sender. Although an author to an email may use a word frequently within the body of the draft email, that word may not form a suitable tag. An example is the use of the word 'the' in English emails. The tag may be placed in an optional field of an email in conformance with, for example, Internet Official Protocol Standards Request for Comments (RFC) 5322, and variants thereof.

FIG. 3 is a table of co-occurrences of tags or a co-occurrence repository in accordance with an illustrative embodiment of the invention. A co-occurrence repository is a list of paired words. The co-occurrence repository may optionally include a date and time that the word pair was added to the repository, as well as other data corresponding with the word pair such as the sender's identifier, the sender's group, and a word pair rating. The table may be generated from previously sent emails or previously submitted emails by a user, or users associated with a user. Accordingly, an historical email tag is any tag stored to the co-occurrence repository. The table forms repository 300 that may indicate a correlation between two words in that two words are added to the list as a record in response to a user identifying both words as tags to the same email or draft email. Alternatively, the list can be of a word that has been recorded as selected first by a user for a particular email or email draft, while the second word is a word that the user selected after prompting by a user interface. Thus, for a two-word record, either the first word, or both words can be used as an email attribute by which the record is indexed or searched.

An email attribute is a word present in the email body, subject line or headers of the email. Email headers are further defined in RFC 5322 and other internet standards, incorporated herein by reference. Accordingly, each record in the co-occurrence table can be a record keyed by an email attribute. Repository 300 has three records keyed by email attribute 'FIR': HR-payroll record 301, HR-benefits record 303, and HR-benefits record 305. The presence of two instances of an HR-benefits record may be used to place priority on the HR-benefits combination over the HR-Payroll combination. In other words, when an email client has a set of words 'Payroll' and 'Benefits', but the 'Benefits' word has higher hit count from the repository, the email client can place the word 'Benefits' more prominently or higher in the list, while placing the word 'Payroll' lower in the list. The email attribute can be a word from a subject, a body or other parts of the email. Accordingly, the step of presenting a tag, as explained further in FIGS. 4 and 6 below can place a priority in presenting or rendering a tag on the basis of frequency of the email attribute to which the tag is associated. In other words, the email client may present a tag having a higher frequency email attribute among the records of the co-occurrence repository as compared to a second tag having a lower frequency email attribute among the records. A lower frequency email attribute is a count of hits of the second tag that is lower than hits of the first tag.

In addition to relying on attributes formed from sent email, the co-occurrence repository can be formed from one or more co-occurrence repositories. Such repositories may be obtained from email records of separate business units, be blended together, and be edited to minimize associations that are preferred to be deprecated.

One or more embodiments may rely on a hit count to determine a prominence with which to display a word for user selection. A hit count can be the number of times the word is found in a repository by reference to one or more searches formulated based on a tag set. A hit threshold can be a measure of the weight that the history of matches must have before suggesting a co-occurring term for inclusion among user-selected tags. The weight of the history of matches can be the number of hits for a word when using the current tags of a draft email as criteria for looking up or searching the co-occurring word pair that includes the hit. For example, when formulating a look-up or search that includes searching alternatively (using Boolean 'or') the terms 'due date', 'template', and 'HR', the repository may be a source for a hit count of '2' for the word 'Benefits' since two records reference the word 'HR'.

Figure 4:
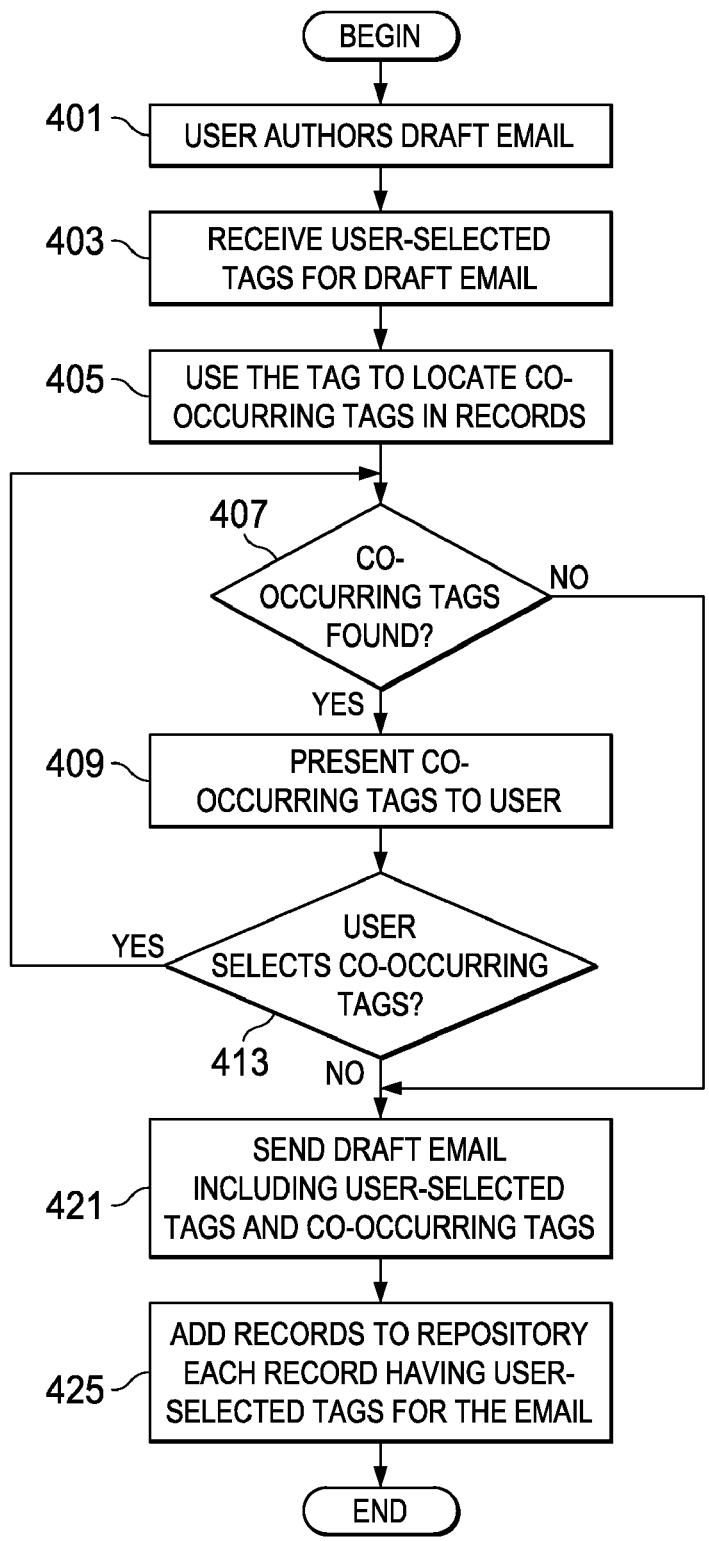
FIG. 4 is a flowchart for receiving tags and selecting tags for use as email tags in accordance with an illustrative embodiment of the invention.

FIG. 4 is a flowchart for receiving tags and selecting tags for use as email tags in accordance with an illustrative embodiment of the invention. Initially, an email client may facilitate a user authoring a draft email (step 401). Next, the user may enter tags. Accordingly, the email client may receive user-selected tags for a draft email (step 403). Receiving the user-selected tags may form an email tag request. For example, a user may trigger the email tag request by clicking on a request tags button, for example, request tags 241 of FIG. 2. An email tag request is a submittal of at least a draft email, with or without tags, to a data processing system executing email client instructions. The email tag request is comprised of one or more word attributes. The subject field may be blank. The draft body of the email can include several words. The body and optionally the email subject may be used as a corpus within which instances of words are searched. Each such word forms a word attribute. A word attribute can be a word selected from the group consisting of a subject line word, a body word and an email tag. The subject line word is a word in the subject line of the draft email. The body word is a word in the body of the draft email. An email tag is a tag in a sent email or within a draft email. Next, the email client may use the tag to locate co-occurring tags in records (step 405). Step 405 may be performed iteratively as a user enters additional tags. Next, the email client may determine if one or more co-occurring tags are found within a repository (step 407). Step 407 can be performed by looking up at least one record based on the word attribute.

If a co-occurring tag is found for one or more tags, the email client may present the co-occurring tags to the user (step 409). Presenting to a user may include displaying the tag to a display. The user can be a human operator that can sense output by the data processing system that executes instructions as an email client. Optionally, the email client may reserve presenting the co-occurring tags unless the co-occurring tags are in a frequent co-occurrence record. In other words, a frequent co-occurrence record is a record for a pair of words or tags that occurs above a threshold number of times within the co-occurrence repository. Next, the email client may determine whether the user selects a co-occurring tag (step 413). If the user selects a co-occurring tag to form a selected tag, the email client may repeat step 407. A user selection is input by a user. The user selection of a tag to form a selected tag can include clicking a send mail button. The user selection can include removing tags where a user may highlight a tag in a list and click a 'remove' button, for example, remove button 261 of FIG. 2. Accordingly, the selection of a co-occurring tag may provide input for use in searching further co-occurring tags by relying on the selected tag as a search term.

A negative outcome at steps 407 or 413 may result in the user electing to send the draft email as an email. The user may input this desire by pressing or otherwise selecting a send mail button or other user input designed to signal to the data processing system a desire to send an email. Accordingly, the email client may send the email including user-selected tags and co-occurring tags (step 421). Thus, the email client may use the selected tag or tags as part of the email header such that the email is comprised of the email tag request. Finally, the email client may add records to a repository such that each record includes all tags selected by the user for the email (step 425). Accordingly, step 425 stores a tag keyed by the email attribute. Processing may terminate thereafter.

As an example, a user may initially select the words 'due date', 'template', 'FIR' to be tags for the draft email. Accordingly, the email client may reference a co-occurrence repository, for example, co-occurrence repository 300 of FIG. 3. Within co-occurrence repository 300, a match for the word 'FIR' can be a record that includes 'Benefits' and a record that includes the word 'Payroll'. In other words, based on the user supplied 'FIR', two co-occurring tags are found for the word 'FIR'. Accordingly, the user interface can provide two recommendations in pick-list 281: 'Benefits' and 'Payroll'.

In response to a user selecting on the word 'Benefits', the email client can add the word 'Benefits' to the list of tags in the draft email. Selecting the co-occurring tag may be done by clicking a displayed word using a mouse, relying on keyboard inputs, or other conventional methods. Alternatively, a user may feel that the current list of tags is sufficient and indicate a choice to send the draft email as email. Accordingly, the user can click on the button labeled 'SEND EMAIL'. The email client may then process the set of words used as tags in a manner to add their co-occurrence as records to the co-occurrence repository.

FIG. 5 is the set of records that can be appended or otherwise added to the co-occurrence repository 300 in accordance with an illustrative embodiment of the invention. Records 501, 503, and 505 are the three permutations of word pairs involving the words 'due date', 'template', and 'FIR'. The record includes at least one word pair. Additions to the co-occurrence repository may be cumulative and redundant. In other words, there may be multiple instances of the 'due date' and 'template' combination, one for each time a user sent email having those words among the tags. In addition, the co-occurrence repository may record the date and time of the paired use of two words as tags. Accordingly, less weight may be placed on word pairs used long ago, as compared to word pairs used as tags in a recent email. By providing a record of ages of the word pair usage, the email client may permit obsolescence of word pairings to occur in a manner to place emphasis on word pairs recently found to be co-occurring among tags in an email.

For example, co-occurrence of 'dot matrix' and 'printer' may be co-occurring tags in emails used a decade ago, while the co-occurrence of 'laser' and 'printer' may be co-occurring with regularity in emails sent today. Accordingly, the time of co-occurrence can permit the email client to weight co-occurrences using a function that decays as the prior co-occurrence ages.

Thus, an illustrative embodiment may order a list of co-occurring tags to show at a top of the list (see, for example, list 281 of FIG. 2) words that have the highest absolute frequency of co-occurrence with the set of words present as tags in the draft email. In addition, an illustrative embodiment may weight counts of word pairs with a high weight if present in the last 30 days, weight counts of word pairs with a moderate weight if present in the 31-60 previous days, and weight counts of word pairs with a low weight if present during a period prior to 60 days. The high weight, moderate weight and low weight may be, for example, 1.5, 1.0, and 0.3 respectively.

Figure 6:
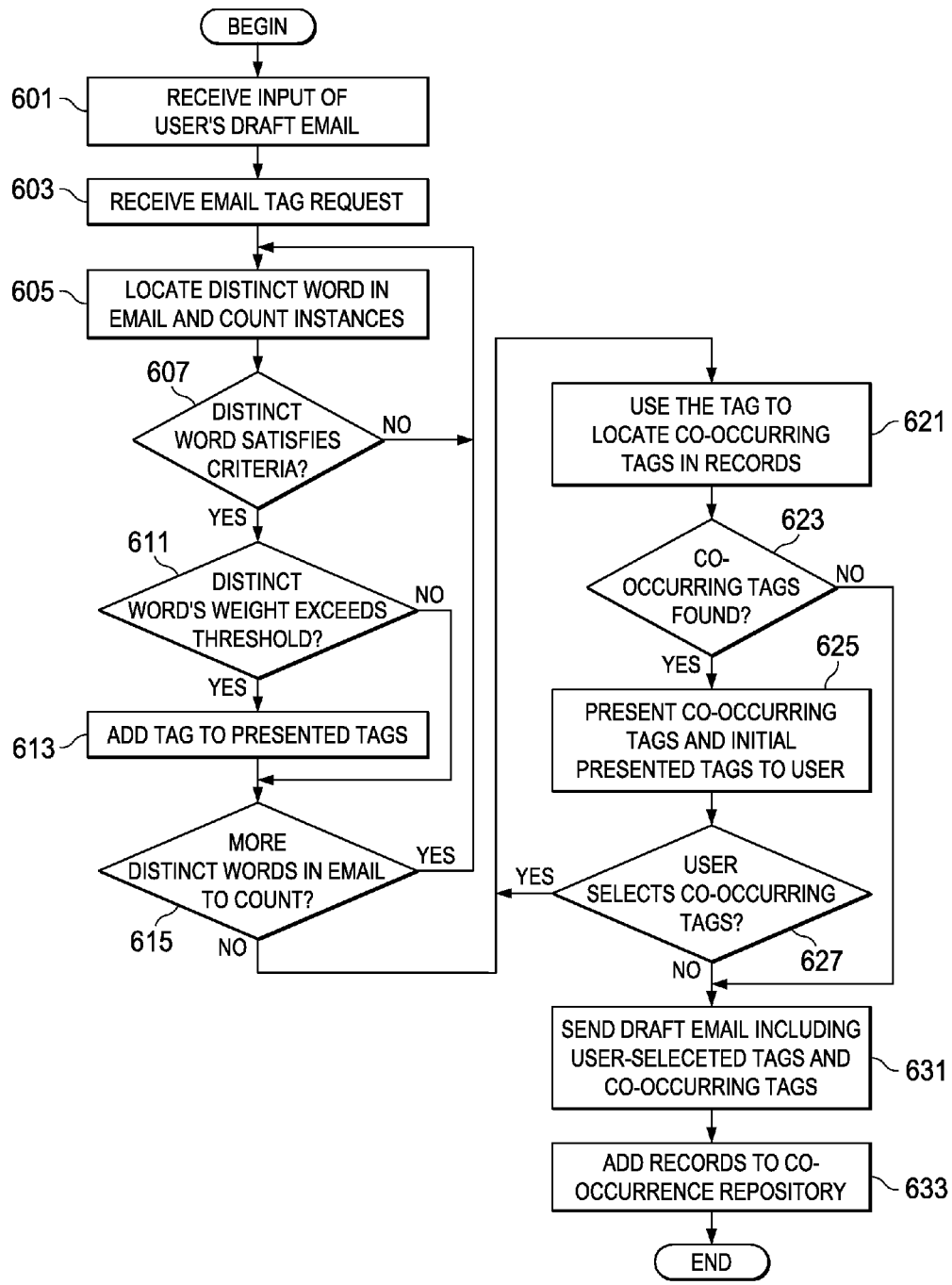
FIG. 6 is flowchart for automatically prompting a user to select keywords in accordance with an illustrative embodiment of the invention.

FIG. 6 is flowchart for automatically prompting a user to select keywords in accordance with an illustrative embodiment of the invention. Initially, an email client receives input of a user's draft email (step 601). Next, the email client may receive an email tag request (step 603). For each distinct word present in the email, the email client may count occurrences of instances of the word within the email. A distinct word is the first occurrence of a string of characters or its equivalent delimited by commonly used punctuation and white space. An instance of the distinct word is an identical character string or an equivalent character string. For example, an equivalent character string may be a string that varies only with respect to the case of one or more characters from the compared-to string. Another equivalent character string can be a string that differs only because of the presence of a hyphen, such as may occur when a word is split between lines in a justified tract of text.

Accordingly, the email client may locate a distinct word in email and count instances of the distinct word (step 605). By counting instances of a distinct word, the email client may develop a hit count for each distinct word. A hit count is the count of instances of a distinct word determined by the email client. The hit count may be taken into account later at step 613. To avoid confusion that may occur by the frequent occurrence of low-value parts of speech, the email client may determine if a distinct word satisfies a criteria (step 607).

The criteria can be formulated to select words that are meaningful, and exclude words that are so common as to provide little if any meaning or context. Low-value parts of speech may be classes of words, or pre-determined arbitrary sets of words that a developer or system administrator may identify as having little to do with context. The articles 'a' and 'the' are examples of words that may occur frequently, but provide low or no value when used as a tag. These words can form an exclusionary set of words used to determine that a word of the draft email fails to satisfy a criteria. For example, the words excluded can include "e.g.", "a.m." as well as others viewed to not be useful in judging or searching the content of email. The criteria can be very simple, such as to use only words of three characters or more. The criteria can be a regular expression.

Accordingly, the weight of the word can be merely the hit count of the word. The hit count can be based on the occurrence of the distinct word within the body of the draft email, the subject line, or both the body and the subject line.

In addition, the criteria may exclude words that form email addresses.

Thus, the email client may determine if the distinct word's weight exceeds a threshold (step 611). A frequent word attribute is a word that exceeds a threshold. A weight is a value assigned a character string or word, based in part on the number of times the character string, or its equivalent, appears within a corpus, such as a body to an email that may form the part of an email tag request. A distinct word that is assigned a weight can be a weighted word. A weighted word is a word that has been assigned a weight based on the number of instances of matching character strings within an email tag request. The count of instances of the weighted word is the frequency of the weighted word within the email request. A threshold is a weight value that the distinct word must have before the distinct word is considered to be frequently occurring within the draft email. The weight may be a formulation that places a weight on the word based on a term frequency inverse document frequency or TF-IDF. A positive determination to the test of step 611 can trigger the email client adding the distinct word as a tag to a list of presented tags (step 613). Next or following a negative determination at step 611, the email client may determine if more distinct words are present in the email to count (step 615). If so, the email client further processes any additional distinct words at step 605. At this point, the email client may have a set of words that can operate as a default set of tags for the draft email. Each word may have varying weights.

Next, the email client may augment the initial set of tags with tags recommended based on a repository of co-occurring tags that have been logged from previously sent emails. Accordingly, the email client may use the tags to locate co-occurring tags in records (step 621). Next, the email client may determine whether co-occurring tags are found (step 623). Step 623 can be performed by looking up at least one record based on the distinct word attribute. If co-occurring tags are found, the email client may present co-occurring tags and the initial presented tags to the user (step 625). Alternatively, step 625 may filter the co-occurring tags found at step 623 to select a tag of a record having a highest co-occurrence among tags located in step 623. The highest co-occurrence is the tag that appears in the most records matched while looking up records based on the email tag request. Next, the user may select co-occurring tags (step 627). Selecting the tags may merely be the user accepting the list of tags, 'as is', and clicking on a send email button, for example, send email 251 of FIG. 2. Alternatively, the user may add distinct words not earlier presented so that the added distinct words form tags. The user may add the distinct words as tags by adding words to a tag field, such as tag field 721 of FIG. 7, below. Such added distinct words may themselves be used as search terms for searching the co-occurrence repository. Accordingly, processing may resume at step 621. Alternatively, if no further changes occur to the tags by the user, the email client may send the draft email including the user-selected tags and co-occurring tags (step 631). Step 631 also follows a determination at step 623 that no co-occurring tags are found. Step 631 may be prompted by a user clicking on a send email button.

Next, the email client may add records to the co-occurrence repository (step 633). The co-occurrence repository may be, for example, co-occurrence repository 300 of FIG. 3. The email client may record word pairs that represent every permutation of tags that co-occur in the sent email. In addition, the email client may associate a time with each record in order for the record's influence to decay with time.

Step 633 may operate in several ways. For example, the co-occurrence repository can be organized to pool the inputs from multiple email authors, or alternatively, be formed solely from the inputs of a single user as author of an email. Thus, the co-occurrence repository can be a set of records derived from email tag requests where each illustrative embodiment may vary the group of email authors. For example, the repository may pool the tags selected by peers of a user. Thus, the user can be introduced to new tags based on inputs from the peer group. In its simplest form, the co-occurrence repository may be formulated using tags where the user is the author. Stated another way, a co-occurrence repository may rely solely on emails authored or submitted by the user. In such cases, the user is identified on the from-attribute of the draft emails presented in email tag requests.

Other forms of the co-occurrence repository can include inputs from users that are within an organization that counts the user as a member. For example, the peer-authored emails or email tag requests can serve as a source for records in the co-occurrence repository. Thus, the repository may be constituted from email tag requests that populate the email's to-attribute with a descriptor of the user. The repository may be based on email tag requests that populate the to-attribute without a descriptor of the user. The repository may be based on email tag requests that populate the from-attribute without a descriptor of the user. Accordingly, multiple email clients, each used by a separate user, may supply content to a common co-occurrence repository. Thus, the co-occurrence repository may accrue records from historical email tag requests by a single user or by historical email tag requests by peers to a user.

FIG. 7 is a user interface having a draft email in accordance with an illustrative embodiment of the invention. FIG. 7 may produce tags 721 based on output of step 613 of FIG. 6, wherein tags are selected from the body and/or subject line of an email, provided they are weighted sufficiently, for example, on the basis of frequency within the draft email. Similarly, the user interface may also select a distinct word 'Benefits' for optional inclusion as a co-occurring tag 751.

The illustrative embodiments permit a user to rely on history of either his emails or those of associates to receive automatically generated candidates for inclusion as tags in a draft email. In addition, an email client may obtain tags by distilling from the draft email itself, a list of distinct words that satisfy criteria and are sufficiently frequent to be useful to the user in identifying weighted words suited to summarize the content of the draft email. Accordingly, the illustrative embodiments may reduce decision-making time and typing of a user when a user chooses tags for an email.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for associating an email with a tag, the method comprising:
   receiving a tag corresponding to an email attribute, wherein the email attribute is a historical email tag;
   storing the tag to a record keyed by the email attribute;
   receiving an email tag request, the email tag request having a word attribute, wherein the word attribute is a subject line word or a body word;
   looking up at least one record based on the word attribute to find the tag;
   presenting the tag of the at least one record to a user;
   receiving a user selection of the tag to form a selected tag;
   sending an email having the selected tag as part of a header of the email, wherein the email comprises the email tag request;
   selecting a weighted word that weighs above a threshold to form a frequent word attribute; and
   selecting frequent co-occurrence records based on the frequent word attribute having a hit count above a hit threshold among records to form the tag, wherein presenting the tag comprises presenting the tag of a record having a highest co-occurrence.

2. The computer implemented method of claim 1, further comprising adding a record to a co-occurrence repository, wherein the record comprises the word attribute and the tag.

3. The computer implemented method of claim 1, wherein looking up the record is based on a set of records derived from email tag requests selected from a group consisting of email tag requests having a to-attribute of the user; email tag requests having a from-attribute of the user, email tag requests having to-attribute not including the user, and email tag requests having from-attribute not including the user.

4. The computer implemented method of claim 1, wherein the weighted word is associated with weights based on a term frequency inverse document frequency method.

5. The computer implemented method of claim 1, wherein the word attribute is the email tag, wherein the email attribute is selected from the historical email tag, and wherein looking up the at least one record is based on the email tag used as the word attribute.

6. The computer implemented method of claim 5, wherein the email tag request comprises a second word attribute, the method further comprising:
   storing the tag of the at least one record with the second word attribute to form a second record keyed by the second word attribute.

7. The computer implemented method of claim 6, wherein presenting the tag of the at least one record to a user comprises:
   presenting a first tag having a higher frequency email attribute among the at least one record in priority over a second tag having a lower frequency email attribute among the at least one record.

8. The computer implemented method of claim 5, further comprising:
   receiving a second email tag request having a second word attribute, wherein the word attribute comprises the selected tag;
   looking up at least one second record based on the word attribute to find a second tag;
   presenting the second tag of the at least one record to a user; and
   receiving a user selection of the tag and second tag.

9. The computer implemented method of claim 5, wherein storing the tag to a record keyed by the email attribute further comprises:
   storing the tag to a record based on historical email tag requests by a single user.

10. The computer implemented method of claim 5, wherein storing the tag to a record keyed by the email attribute further comprises storing the tag to a record based on historical email tag requests by users belonging to an organization.

11. A computer program product for associating an email with a tag, the computer program product comprising: a computer readable storage device having computer readable program code stored thereon, the computer readable program code comprising:
   computer readable program code configured to receive a tag corresponding to an email attribute, wherein the email attribute is a historical email tag;
   computer readable program code configured to store the tag to a record keyed by the email attribute;
   computer readable program code configured to receive an email tag request, the email tag request having a word attribute, wherein the word attribute is a subject line word or a body word;
   computer readable program code configured to look up at least one record based on the word attribute to find the tag;
   computer readable program code configured to present the tag of the at least one record to a user;
   computer readable program code configured to receive a user selection of the tag to form a selected tag;
   computer readable program code configured to send an email having the selected tag as part of a header of the email, wherein the email comprises the email tag request;
   computer readable program code configured to select a weighted word that weighs above a threshold to form a frequent word attribute; and
   computer readable program code configured to select frequent co-occurrence records based on the frequent word attribute having a hit count above a hit threshold among records to form the tag, wherein the computer readable program code configured to present the tag comprises computer readable program code configured to present the tag of a record having a highest co-occurrence.

12. The computer program product of claim 11, wherein the weighted word is associated with weights based on a term frequency inverse document frequency method.

13. The computer program product of claim 11, wherein the word attribute is the email tag, wherein the email attribute is selected from the historical email tag, and wherein the computer readable program code configured to look up the at least one record comprises computer readable program code to look up the at least one record using the email tag as the word attribute.

14. The computer program product of claim 13, further comprising:
   computer readable program code, stored on the computer readable storage device, configured to store the tag of the at least one record with a second word attribute to form a second record keyed by the second word attribute;
   wherein the computer readable program code configured to present the tag of the at least one record to a user comprises computer readable program code configured to present a first tag having a higher frequency email attribute among the at least one record in priority over a second tag having a lower frequency email attribute among the at least one record, wherein the email tag request comprises the second word attribute.

15. The computer program product of claim 13, further comprising:
   computer readable program code, stored on the computer readable storage device, configured to receive a second email tag request having a second word attribute, wherein the word attribute comprises the selected tag;
   computer readable program code, stored on the computer readable storage device, configured to look up at least one second record based on the word attribute to find a second tag;
   computer readable program code, stored on the computer readable storage device, configured to present the second tag of the at least one record to a user; and
   computer readable program code, stored on the computer readable storage device, configured to receive a user selection of the tag and second tag.

16. The computer program product of claim 13, wherein the computer readable program code configured to store the tag to a record keyed by the email attribute further comprises:
   computer readable program code configured to store the tag to the record based on historical email tag requests of at least one user.

17. A computer system for associating an email with a tag, the computer system comprising:
   a processor;
   a computer readable memory;
   a computer readable storage device containing program instructions;
   first program instructions to receive a tag corresponding to an email attribute;
   second program instructions to store the tag to a record keyed by the email attribute;
   third program instructions to receive an email tag request, the email tag request having a word attribute, wherein the word attribute is a word selected from a group consisting of subject line word, body word and email tag;
   fourth program instructions to look up at least one record based on the word attribute to find the tag;
   fifth program instructions to present the tag of the at least one record to a user;

sixth program instructions to receive a user selection of the tag to form a selected tag;

seventh program instructions to send an email having the selected tag as part of a header of the email, wherein the email comprises the email tag request;

eighth program instructions to select a weighted word that weighs above a threshold to form a frequent word attribute; and ninth program instructions to select frequent co-occurrence records based on the frequent word attribute having a hit count above a hit threshold among records to form the tag, wherein the fifth program instructions to present the tag comprise program instructions to present the tag of a record having a highest co-occurrence; and wherein the first, second, third, fourth, fifth, sixth, seventh, eighth, and ninth program instructions are stored on the computer readable storage device for execution by the processor via the computer readable memory.

18. The computer system of claim 17, wherein the weighted word is associated with weights based on a term frequency inverse document frequency method.

19. The computer system of claim 17, wherein the word attribute is the email tag, wherein the email attribute is selected from a historical email tag, and wherein the fourth program instructions to look up the at least one record comprise program instructions to look up the at least one record using the email tag as the word attribute.

20. The computer system of claim 19, further comprising:
tenth program instructions to store the tag of the at least one record with a second word attribute to form a second record keyed by the second word attribute, wherein the fifth program instructions to present the tag of the at least one record to a user comprise program instructions to present a first tag having a higher frequency email attribute among the at least one record in priority over a second tag having a lower frequency email attribute among the at least one record, wherein the email tag request comprises the second word attribute; and wherein the tenth program instructions are stored on the computer readable storage device for execution by the processor via the computer readable memory.

21. The computer system of claim 19, further comprising:
tenth program instructions to receive a second email tag request having a second word attribute, wherein the word attribute comprises the selected tag;
eleventh program instructions to look up at least one second record based on the word attribute to find a second tag;
twelfth program instructions to present the second tag of the at least one record to a user; and
thirteenth program instructions to receive a user selection of the tag and second tag; and wherein
the tenth, eleventh, twelfth, and thirteenth program instructions are stored on the computer readable storage device for execution by the processor via the computer readable memory.

22. The computer system of claim 19, wherein the second program instructions to store the tag to a record keyed by the email attribute comprise:
tenth program instructions to store the tag to a record based on historical email tag requests of at least one user; and wherein the tenth program instructions are stored on the computer readable storage device for execution by the processor via the computer readable memory.

* * * * *